United States Patent [19]

Pawlowski

[11] Patent Number: 5,230,733
[45] Date of Patent: Jul. 27, 1993

[54] POLYMERIC REACTIVE DYES AND INKS FORMULATED BY INSOLUBILIZING REACTIONS INITIATED BY LOSS OF WATER

[75] Inventor: Norman E. Pawlowski, Corvallis, Oreg.

[73] Assignee: Hewlett-Packard Company, Palo Alto, Calif.

[21] Appl. No.: 786,627

[22] Filed: Nov. 1, 1991

[51] Int. Cl.$^5$ .................. C09D 11/00; C08L 29/04
[52] U.S. Cl. .................. 106/22 R; 106/22 H; 106/22 K; 524/557; 524/802; 524/803; 524/812
[58] Field of Search ........... 524/803, 812, 816, 802, 524/557; 522/147; 106/22 R, 22 B, 22 H, 22 K, 22 D

[56] References Cited
U.S. PATENT DOCUMENTS 4,514,487  4/1985  Kasuya et al. .................. 524/803
4,624,985  11/1986  Tsutsumi et al. ................ 524/803
4,877,680  10/1989  Sakaki et al. .................... 428/332

Primary Examiner—Paul R. Michl
Assistant Examiner—Tae H. Yoon

[57] ABSTRACT

A water-soluble ink-jet dye for use in ink-jet printing is designed to undergo a reaction, initiated by the loss of water and natural neutralization, as the ink dries on paper, causing the dye to (1) change and lose solubility and (2) bind to the paper. The dye comprises a polymeric chain, to which one or more chromophores are attached. Also attached to the chain are a plurality of hydroxyl or amine groups, up to approximately one-half of which are converted to carboxyl groups. The ink containing the dye is maintained at a basic pH. Upon printing on a print substrate, the dye is neutralized, causing lactone (from hydroxyl groups) or lactam (from amine groups) ring formation. The resulting reacted dye is substantially totally waterfast on the print substrate.

19 Claims, 3 Drawing Sheets

↓ DYE COUPLING

↓ Cl—CH$_2$—CO$_2^-$ M$^+$
(BASIC CONDITIONS)

↓ ACID

↓ Cl—CH₂—COOH
1/2 EQUIVALENT

↓ DYE COUPLING

↓ LOSS OF WATER

POLYMERIC REACTIVE DYES AND INKS FORMULATED BY INSOLUBILIZING REACTIONS INITIATED BY LOSS OF WATER

TECHNICAL FIELD

The present invention relates to ink-jet inks used in ink-jet printing, and, more particularly, to water-soluble dyes and their formulation used in such inks.

BACKGROUND ART

Water-based inks are preferred for ink-jet printing. However, water-soluble dyes when printed via ink-jet have poor waterfastness. To overcome the problems caused by the lack of waterfastness, some dyes have been made with carboxylate solubilizing groups attached to the dye molecule. These dyes, upon natural neutralization, change to the less soluble carboxylic acid form. Such dyes give greatly improved waterfastness, but still are not totally waterfast. Further, inks with such dyes are limited to printing on porous substrates such as paper, and perform poorly on such substrates as packaging materials. Water-soluble dyes, when printed on non-absorbable surfaces, remain wet and somewhat hygroscopic and can be smeared by simple abrasion.

A need remains to provide a water-soluble dye for ink-jet printing evidencing substantially total waterfastness. The present invention provides a polar, water-soluble dye which undergoes a change on the surface of the print substrate, changing the dye to a hydrophobic, water-insoluble polymeric dye.

DISCLOSURE OF INVENTION

In accordance with the invention, a water-soluble dye for use in ink-jet inks for printing onto print substrates is provided. The dye is designed to undergo a reaction, initiated by the loss of water and natural neutralization, as the ink dries on the print substrate (paper, transparency film, packaging materials, and the like), causing the dye to (1) change and lose solubility and (2) bind t the paper.

The water-soluble dye comprises a polymeric chain having a plurality of five- to eight-membered lactone or lactam rings and at least one chromophore attached to the chain. In one embodiment, the polymeric chain has carboxyl groups attached thereto and either hydroxyl groups or amine groups, which upon neutralization is able to close into either the lactone or the lactam rings, respectively.

Alternatively, the system may be considered as comprising a polymer having a plurality of dye chromophores attached thereto. The polymer has a plurality of carboxyl groups, and a plurality of either hydroxyl groups or amine groups, which upon neutralization is able to close into either the lactone or the lactam rings, respectively.

An ink for ink-jet printing comprises a vehicle and the dye as above, with at least one chromophore attached, to the polymer chain. The vehicle is one commonly employed in ink-jet printing and comprises primarily water. Other components may be added, as necessary. Essentially, the ink comprises at least about 80% water, about 1 to 15% of the dye of the invention, and sufficient buffer to keep the polymer/dye in salt form at a basic pH. The balance, if any, may comprise one or more humectants, surfactants, biocides, and the like customarily employed in ink-jet printing.

Also in accordance with the invention, a method of making the water-soluble dye comprises:

(a) providing a polymeric chain having a molecular weight ranging from about 180 to 100,000 and a plurality of hydroxyl or amine groups attached thereto;

(b) in either order, converting approximately one-half or less of the hydroxyl or amine groups to carboxyl groups, with the carboxyl and the hydroxyl or amine groups alternating;

(c) attaching at least one chromophore to the polymeric chain; and (d) removing water to force neighboring hydroxyl or amine groups and carboxyl groups to form lactone or lactam rings, respectively.

BEST MODES FOR CARRYING OUT THE INVENTION

Figure 1A:
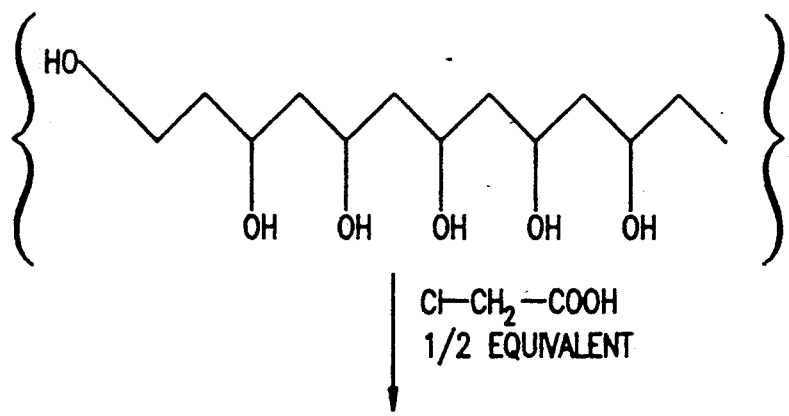
FIGS. 1a–d depict the general schematic representation for converting polyvinyl alcohol into a reactive, solubilizing side chain for dye molecules and the conversion of this side chain into a seven-membered lactone ring upon loss of water.

The invention is directed to the use of a water-soluble ink-jet dye, which, due to its configuration, undergoes a reaction, initiated by loss of water and natural neutralization, as the ink dries on the print substrate, causing the dye to (1) change and lose solubility and (2) bind to the print substrate.

All concentrations herein are in weight percent, unless otherwise indicated. The purity of all components is that employed in normal commercial practice for ink-jet inks.

The following examples are intended to illustrate various aspects of the invention; however, the invention is not limited to the specific illustrative examples.

In the practice of the invention, one or more chromophores are attached to a short polymeric chain having water solubility. The polymeric chains employed in this system are ones with a molecular weight ranging from about 180 to 100,000, and preferably from about 180 to 10,000. The number of chromophores to be attached to the polymeric chain is determined by the hydrophilic/lipophilic balance one wishes to obtain in ink making. For purely aqueous inks with little humectant added, one must obtain sufficient hydrophilic nature for good solubility in the aqueous ink, but sufficient lipophilic nature for complete waterfastness when precipitated onto paper.

The method of attachment of the chromophore is not unique to the invention, and such methods are commonly known in the dye-making industry. Other methods include (a) coupling the sulfonylchloride form of a sulfonated dye to the polymeric chain (or solubilizing group in the second embodiment of the invention, described below), or (b) coupling a reactive dye through its reactive group (for example, a chloride substituent on a s-triazine ring or vinyl sulfone), or (c) coupling through one of the methods disclosed in U.S. Pat. No. 4,375,357, or (d) coupling to hydroxyl groups (as in polyvinyl alcohol). Method (a) is useful for polymers which contain amine groups. Methods (b) and (c) can be used with polymers which contain amine or hydroxyl groups. These first three methods are known in the art. Method (d), which is considered to be novel herein, is useful for polymers which contain hydroxyl groups, and is now more fully described.

In considering coupling the chromophore to a polymer containing at least one hydroxyl group [Method (d), above], an example involves converting a dye, such as Acid Red 52, from its sulfonic acid form to its sulfonyl chloride derivative by means of thionyl chloride, sulfuryl chloride, chlorosulfuric acid, or other acid halogenating agent. Since the chromophore is being coupled to the polymer, only one sulfonate group on the chromophore needs to be converted.

The sulfonyl chloride derivative is then converted to form an amide, using a bifunctional molecule that includes an amino group. An example of such a molecule is an aminoalcohol, such as aminoethanol or aminopropanol.

The amide is converted to a species having a leaving group, such as a halide or sulfonate ester, by action of thionyl chloride, oxalyl chloride, p-toluenesulfonyl chloride, or methanesulfonyl chloride. In the reaction sequence shown below, X represents —Cl (in the case of thionyl chloride or oxalyl chloride) or R—SO$_2$— (in the case of the sulfonyl chlorides), where R is aromatic or methyl. The halide or sulfonate ester is then easily displaced by the nucleophilic nature of polyvinyl alcohol to couple the chromophore to the polymer through an ether linkage. The reaction sequence is shown schematically below, where Ar represents the remainder of the aromatic dye molecule:

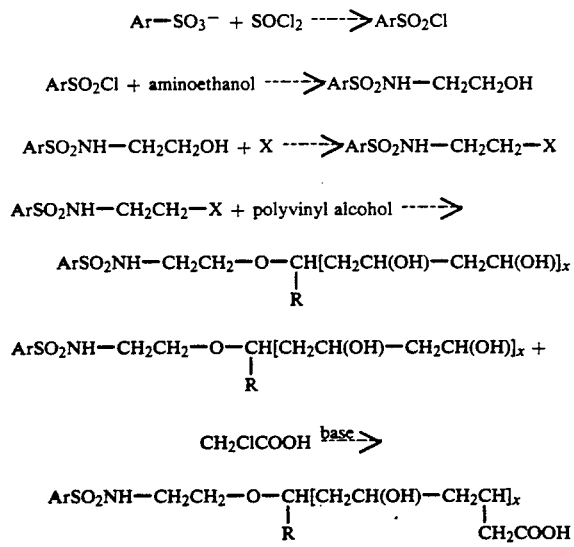

where R is H or polyvinyl alcohol residue.

The use of the reactive dyes prepared as described herein relies on neutralization of the dye on paper, which causes, in the first embodiment, lactone rings to form. Lactone ring formation is accelerated by making the ammonium salt of these dyes. Evaporation of ammonia further drives the neutralization process, and thus, lactone cyclization.

Figure 1B:
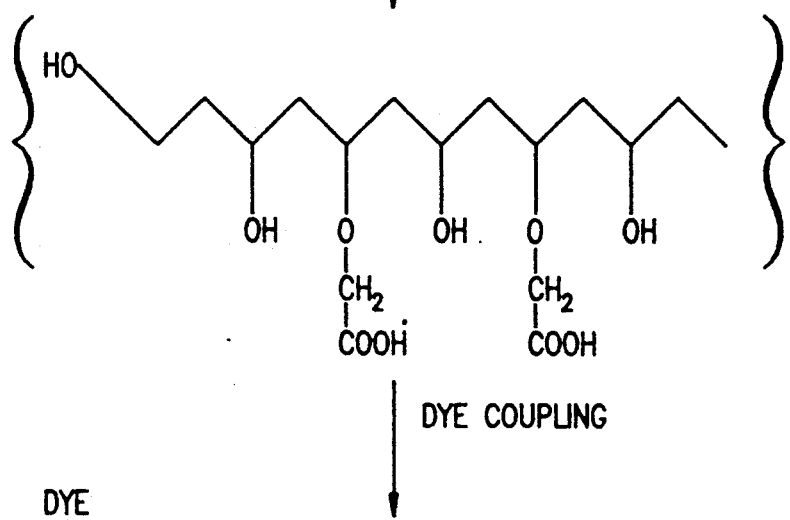
Figure 1C:
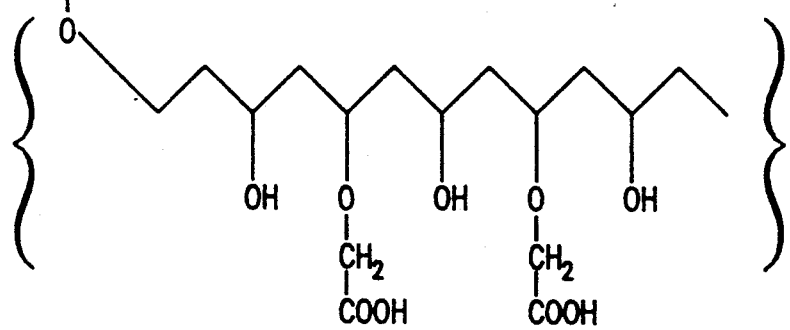
Figure 1D:
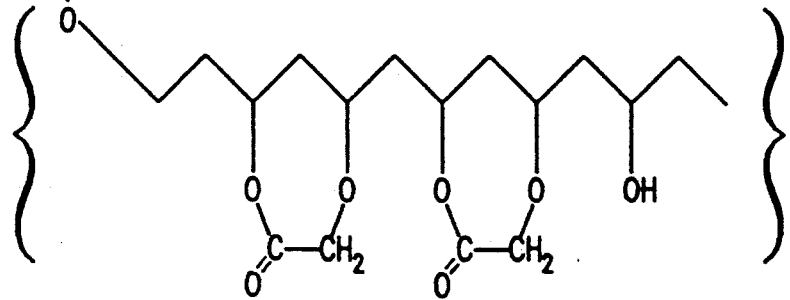
Figure 2A:
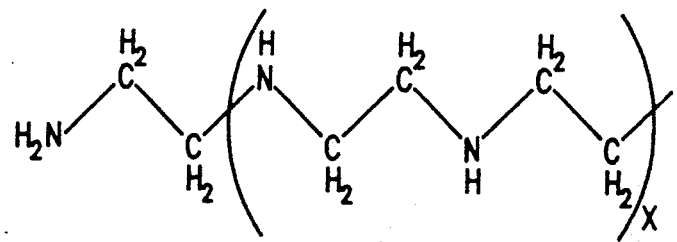
FIGS. 2a–d depict the general schematic representation for converting polyethylenimine into a reactive, solubilizing side chain for dye molecules and the conversion of this side chain into a six-membered lactam ring upon loss of water.
Figure 2B:
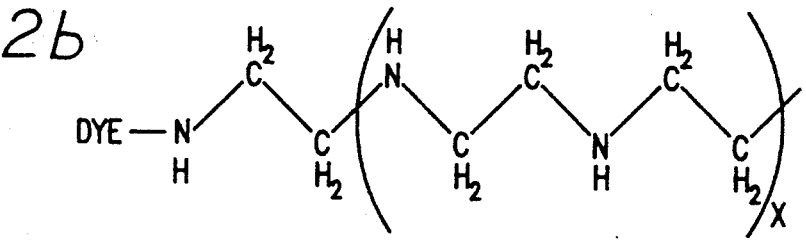
Figure 2C:
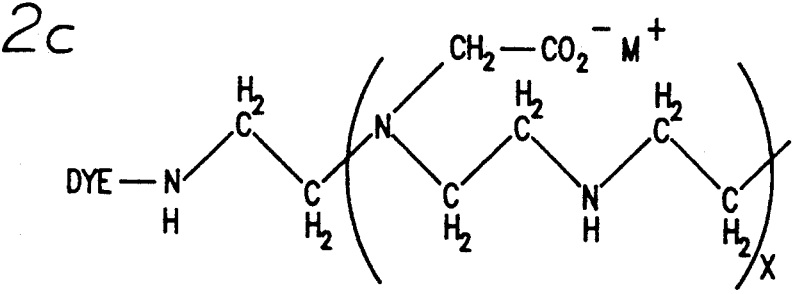
Figure 2D:
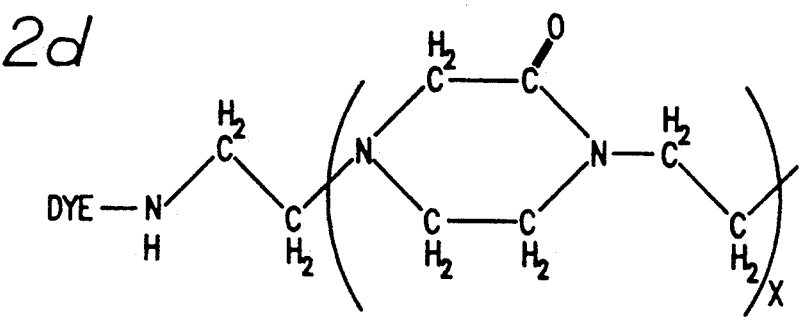
Figure 3A:
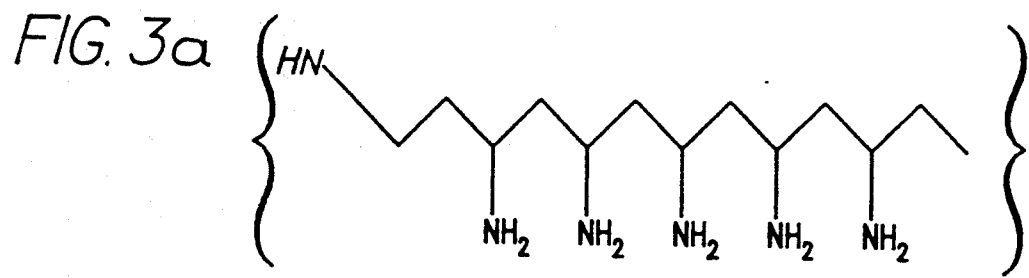
FIGS. 3a–d depict the general schematic representation for converting polyvinyl amine into a reactive, solubilizing side chain for dye molecules and the conversion of this side chain into a seven-membered lactam ring upon loss of water.
Figure 3B:
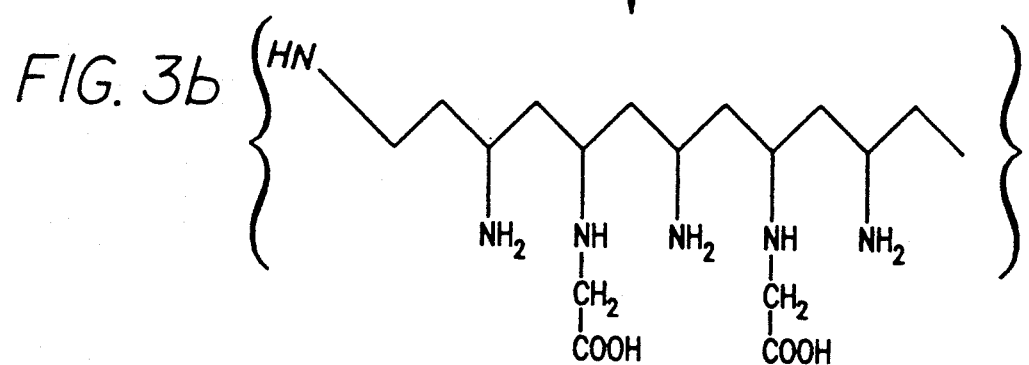
Figure 3C:
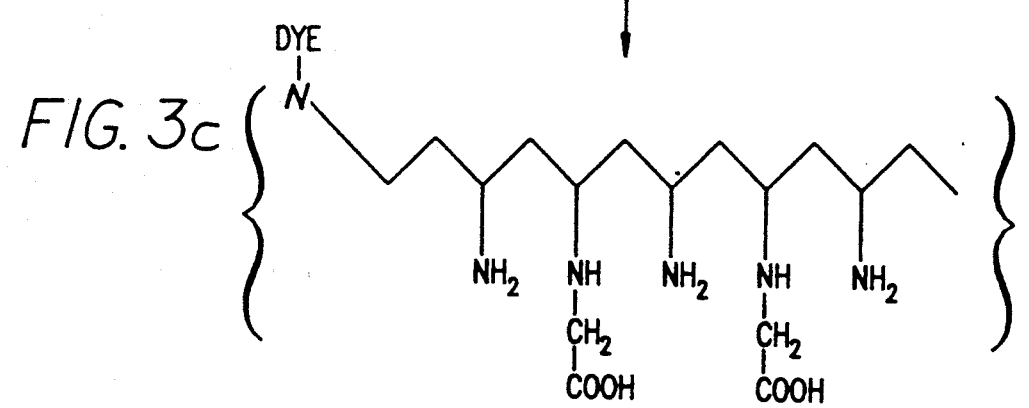
Figure 3D:
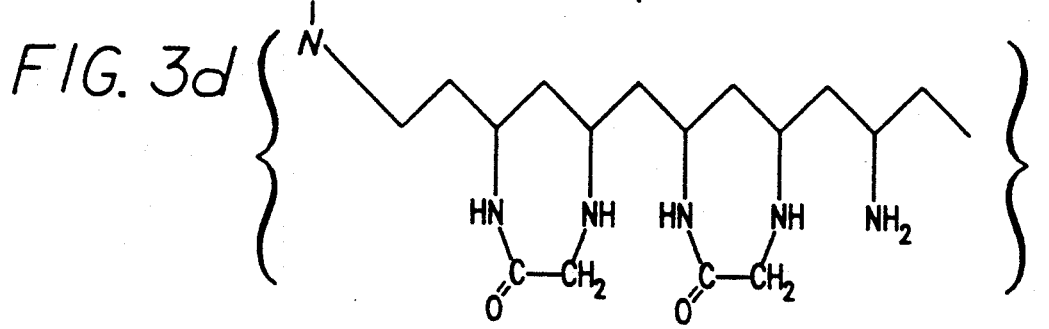

The first embodiment of the invention uses any hydroxyl polymer, such as polyvinyl alcohol or sorbitol. Polyvinyl alcohol gives a seven-membered ring, as shown in FIG. 1. Specifically, reacting up to one-half of the hydroxyl groups (FIG. 1a) with one or two moles of chloroacetic acid (FIG. 1b), followed by coupling with a dye (FIG. 1c) and then ring closure leads to a seven-membered ring (FIG. 1d).

Sorbitol, on the other hand, gives a six-membered ring. When one treats one mole of sorbitol (a six-carbon, straight- chain, polyhydroxy compound) with one or two moles of chloroacetic acid, followed by coupling with a dye, then ring closure leads to a six-membered ring. However, it will be appreciated that other alcohols leading to six- and seven-membered rings may also be employed in the practice of the invention. Further, in either case, dye coupling may be done either prior to or subsequent to reaction with chloroacetic acid (carboxymethylation)

In using polyvinyl alcohol, it will be appreciated by those skilled in the art that commercially-available PVA has from about 2 to 12% acetate groups, depending on the molecular weight of PVA The acetate groups, which are present to prevent the PVA from turning into a tightly twisted polymer and becoming insoluble, should be removed after either the above treatment with chloroacetic acid or the dye coupling. Such removal is readily accomplished by hydrolysis.

In the case of a polyvinyl alcohol (or with the sorbitol system) with an average molecular weight of 1,000, about 1 to 5 dye chromophores are attached to the polymeric chain, with 2 to 3 chromophores being preferred Higher molecular weight polymeric chains are treated proportionally. The dye chromo-phore(s) may be attached either before or after treatment with chloroacetic acid After coupling of polyvinyl alcohol with chloroacetic acid and/or dye chromophores, the excess acetate groups may be hydrolyzed off from the polyvinyl alcohol; as described above.

Due to the water solubility of the polymeric chain, the attachment of an insoluble (or limited solubility) chromophore to the chain serves to impart or increase water solubility to the entire chromophore molecule With longer polymeric chains, multiple chromophores can be attached For example, for a molecular weight of about 1,000, about 2 chromophores would be attached; for a molecular weight of about 10,000, about 10 to 20 chromophores; and for a molecular weight of about 100,000, about 50 to 100 chromophores. (It will be appreciated that when chromophores are attached to a polymer, the number that attaches is an average; some polymer molecules have more chromophores and some less ) This approach permits fabricating polymeric molecules ranging in size from small to large, with either constant or variable ratios for number of chromophores per segmented length of the water-solubilizing chain unit The solubilizing unit, or polymer, contains groups which undergo a condensation reaction eliminating water, but are inhibited from undergoing this reaction in the presence of water (in the ink formulation), because water is a product of the reaction's equilibrium. The condensation or cyclization is further inhibited by a slightly basic pH. The reactive part of such a system can be constructed from polyvinyl alcohol by adding about 0 5 molar equivalent or less of chloroacetic acid for each hydroxyl group present. This reactive polymer is converted to a dye by coupling it to a chromophore molecule as described above [Methods (b) or (c)]. Below, the general schematic representation for converting polyvinyl alcohol into a reactive, solubilizing side chain for dye molecules is shown in FIGS. 1a–d. FIG. 1d depicts the resultant lactone ring upon loss of water.

The dye molecule, now composed of a chromophore and a solubilizing, polymeric side chain, is dependent on the side-chain for its water solubility. The side-chain controls the solubility and physical properties of the whole molecule and thus of chromophore, also. If the chromophore attached is either highly water soluble or insoluble in water, then the overall properties of the entire molecule are balanced to obtain the desired ratio of hydrophilic to lipophilic balance In other words, one adjusts the ratio of dye:polymer:amount of chloroacetic acid used to balance the hydrophilic:lipophilic nature of the product.

Carboxyl groups are primarily responsible for the water-solubilizing effect of the side chain, and such a molecule should ideally have about 2 to 6 carboxyl groups per chromophore, depending upon the number and strength of the polar or solubilizing groups in the basic chromophore itself (the exact number is chosen to balance the solubility of the system against the insolubility of the dye in the form of print after printing with dye in ink).

Molecules containing carboxyl and hydroxyl groups are capable of forming lactones (cyclic esters). Five- and six-membered lactones form most readily, and do so, so readily and spontaneously that ring closure will occur in acid or neutral aqueous solution. Thus, when the ring closes, the molecule loses solubility. As a result, when using these dyes in ink, the ink must be formulated with a basic pH. Accordingly, the method herein is to form lactones of relatively less thermodynamic stability, such as seven- and eight-membered rings, and specifically, seven-membered rings with polyvinyl alcohol polymers. The method shown in FIGS. 1a–c depicts the construction of a system which, in FIG. 1d, closes to a seven-membered lactone ring upon loss of water. For a six-, seven- or eight-membered system, the ink maker must balance the pH in order to keep the ring open in solution, exploiting the following equilibria:

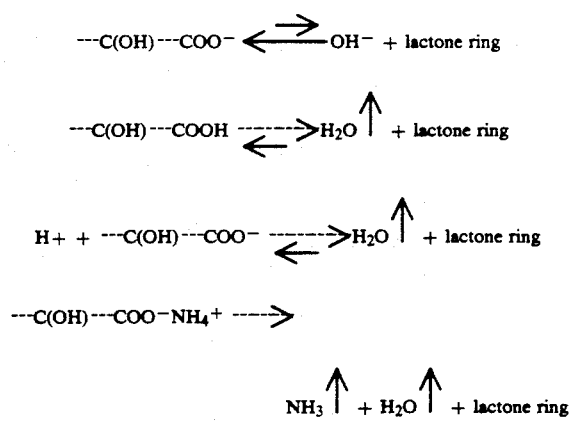

The first reaction represents keeping the lactone ring open in basic solution. One can readily see that loss of water drives the second reaction to the right, and in a buffered ink, natural acidity on paper and $CO_2$ and/or other acid components from air will drive the third reaction to the right also as OH is consumed or as $-COO^-$ is converted to $-COOH$ by natural neutralization ($CO_2$ and paper acidity). The fourth reaction shows loss of ammonia as another method of protonating the carboxyl group.

Thus, the choice of whether to use a six-, seven- or eight-membered lactone and the choice of pH and buffer concentration is a balance between the speed of the reaction on paper and the stability of the dye at the orifice during storage. A platen heater will also drive this reaction. The pH is commonly at least about 7 to 8; ammonium salts may be advantageously employed to maintain a pH of about 8 or greater.

There are numerous examples of natural and synthetic lactones functioning in the manner described above. These examples are in the common chemical literature and text books. However, such lactone-forming reactions have not been used to make dyes, particularly dyes for use in ink-jet inks. Lactone functioning as described above (ring closure and opening) is predictable and reliable.

In another embodiment of the invention, lactam rings can be formed, such as starting with polyethylenimine polymers, which are treated with chloroacetic acid to convert up to about one-half of the amine groups to carboxyl groups, and coupled to a dye chromophore. This is an amine system, which upon drying and acid neutralization, undergoes ring closure to cyclic amides, or lactams. FIGS. 2a–d depict the reaction sequence. When an amino acid closes to a lactam, the reaction is reversible only with difficulty, requiring heating, time, and strong base, and the ink maker must use care not to allow the system to reach neutral or lower pH. Otherwise, the ring closure will occur, resulting in precipitation of the reactive dye system. Again, the carboxymethylation or chromophore coupling can be done in either order.

In a variation of this second embodiment, a polyvinyl amine system, analogous to the polyvinyl alcohol system described above, may be employed to form lactam rings. Such a polyvinyl amine system is treated similarly as the polyvinyl alcohol system, and ring closure to form the corresponding lactam is achieved upon printing the ink containing the dye on the print substrate. The sequence is depicted in FIGS. 3a–d.

Polyvinyl amine is very similar to polyethylenimine; it is the same sequence, except that polyvinyl amine makes seven-membered lactam rings, while polyethylenimine makes six-membered lactam rings.

While the description has focused on the formation of six- and seven-membered lactone rings, information has also been provided as to the formation of five- and eight-membered lactone rings. Such additional ring systems are also considered to fall within the scope of the invention. Correspondingly, five- to eight-membered lactam rings may also be formed in accordance with the invention, with six- and seven-membered lactam rings preferred.

In formulating inks of the invention, about 1 to 15% of the dye is employed, along with at least about 80% water, and preferably at least about 90% water. While the polymer/dye systems of the invention also appear to act as humectants, one or more of the commonly employed humectants (glycols, glycol ethers, etc.) and/or organic solvents (alcohols, ketones, etc.) may be added to optimize certain properties of the inks. The components of the vehicle and their concentration do not form a part of this invention, other than to the extent of the minimum water concentration, indicated above.

The inks may also include one or more biocides, fungicides, and/or slimicides, as is commonly practiced in the art. Microbial reagents include, but are not limited to, NUOSEPT (Nudex, Inc., a division of Huls America, UCARCIDE (Union Carbide), VANCIDE (RT Vanderbilt Co.), and PROXEL (ICI Americas).

The inks of the invention are totally waterfast on print substrates, yet retain the desirably properties of high print quality and print color.

INDUSTRIAL APPLICABILITY

Inks employing the reactive dyes prepared in accordance with the invention are expected to find use in ink-jet printers.

Thus, there have been disclosed water-soluble, reactive dyes suitable for ink-jet printing which lose solubility upon reaction with paper and which bind thereto. Various changes and modifications of an obvious nature will be readily apparent to those of ordinary skill in this art, and all such changes and modifications are considered to fall within the scope of the invention, as defined by the appended claims.

What is claimed is:

1. A water-soluble dye comprising a polymeric chain with carboxyl groups and either hydroxyl groups or amine groups having the capability to form at least one five- to eight-membered lactone or lactam ring by condensing with the carboxyl groups, but remaining in the ring open form when dissolved in aqueous inks at slightly basic pH, and having at least one chromophore attached to the chain.

2. The dye of claim 1 wherein said polymeric chain has a plurality of six- or seven-membered lactone or lactam rings.

3. A dye with a polymeric chain attached thereto, said polymeric chain (a) having at least one chromophore attached thereto and (b) having carboxyl groups and either hydroxyl groups or amine groups attached thereto, which upon neutralization is able to close into either a lactone or a lactam ring, respectively.

4. A polymer having a plurality of dye chromophores attached thereto, said polymer having a plurality of carboxyl groups, and a plurality of either hydroxyl groups or amine groups, which upon neutralization is able to close into either a lactone or a lactam ring, respectively.

5. The polymer of claim 4 wherein said polymer is a polyvinyl polymer or a sorbitol polymer having about 1 to 5 carboxyl groups per dye chromophore attached thereto.

6. The polymer of claim 5 having 2 to 3 carboxyl groups per dye chromophore attached thereto.

7. A polyvinyl alcohol-based polymer having attached thereto at least one dye chromophore, said polymer having at least one carboxyl group and at least one hydroxyl group, which upon neutralization is able to close into at least one lactone ring.

8. The polymer of claim 7 having about 1 to 5 carboxyl groups per dye chromophore attached thereto.

9. The polymer of claim 8 having 2 to 3 carboxyl groups per dye chromophore attached thereto.

10. An ink for ink-jet printing comprising a vehicle and a water-soluble dye, wherein said dye comprises a polymeric chain (a) having at least one chromophore attached thereto and (b) having carboxyl groups and either hydroxyl groups or amine groups attached thereto, which upon neutralization is able to close into either a lactone or a lactam ring, respectively.

11. The ink of claim 10 wherein said polymeric chain upon closure has a plurality of five- to eight-membered lactone or lactam rings.

12. The ink of claim 10 wherein said polymeric chain upon closure has a plurality of six- or seven-membered lactone rings.

13. The ink of claim 10 comprising at least about 80% water, about 1 to 15% dye, and sufficient buffer to keep said carboxyl groups on said dye in salt form with a basic pH.

14. A method of making a water-soluble dye comprising:
(a) providing a polymeric chain having a molecular weight ranging from about 180 to 100,000 and a plurality of hydroxyl or amine groups attached thereto;
(b) in either order, converting up to approximately one-half of said hydroxyl or amine groups to carboxyl groups, with said carboxyl and said hydroxyl or amine groups alternating;
(c) attaching at least one chromophore to said chain; and
(d) removing water to force neighboring carboxyl groups and hydroxyl or amine groups to form lactone or lactam rings, respectively.

15. The method of claim 14 wherein said lactone or lactam rings comprise from five- to eight-membered rings.

16. The method of claim 15 wherein said lactone or lactam rings comprise six- to seven-membered rings.

17. The method of claim 14 wherein said polymeric chain comprises a compound selected from the group consisting of polyvinyl alcohol and sorbitol.

18. The method of claim 17 wherein said polymeric chain is reacted with chloroacetic acid to replace up to approximately one-half of said hydroxyl groups with carboxymethyl groups.

19. The method of claim 17 wherein said polymeric chain comprises polyvinyl alcohol, said polyvinyl alcohol possibly containing acetate groups, and wherein any such acetate groups are removed by hydrolysis after said conversion of hydroxyl groups to carboxyl groups or said chromophore attachment.

* * * * *